Patented Dec. 17, 1935

2,024,392

UNITED STATES PATENT OFFICE 2,024,392

INSECTICIDAL PREPARATION

Herbert Schotte and Karl Görnitz, Berlin, Germany, assignors to Schering-Kahlbaum A. G., Berlin, Germany No Drawing. Application December 12, 1933, Serial No. 702,025. In Germany November 13, 1931

6 Claims. (Cl. 167—24)

Our invention refers to insecticidal substances, more especially such as are contained in vegetable drugs exerting an insecticidal action. It has particular reference to insecticides containing rotenon $C_{23}H_{22}O_6$ or the like, and it is one of the objects of this invention to provide insecticides containing rotenon which are more efficient than similar products hitherto used.

As is well known to those skilled in the art, insecticides prepared from the roots of plants belonging to the genus derris, lonchocarpus and others and containing rotenon or the like are particularly efficient, but the high price of these drugs has proven to be prohibitive as regards their use on a large scale.

We have now found that by combining one of these drugs containing rotenon with a drug containing veratrin $C_{37}H_{53}O_{11}N$, for instance sabadilla seed or an extract or alkaloids recovered from such products, an insecticidal effect is obtained, which is far greater than the effects exerted by the two drugs if used singly.

That this is true, is shown by the following comparative tests made by using strewable preparations consisting of intimate ground mixtures of semen sabadillæ with talc, radix derridis elippticæ with talc and with a mixture of semen sabadillæ and radix derridis ellipticæ. In each test 30 caterpillars of tephroclystia absinthieta Cl. (geometridæ) place on blotting paper were dusted in with a quantity of one of the mixtures corresponding to .16 milligram per square centimetre, the powder being evenly distributed.

| Preparation | Dead caterpillars | Number of caterpillars not killed |
|---|---|---|
| Talc+2.5% derris root | 1 | 29 |
| Talc+5% derris root | 10 | 20 |
| Talc+7.5% derris root | 18 | 12 |
| Talc+7.5% sabadilla seed | 17 | 13 |
| Talc+10% sabadilla seed | 19 | 11 |
| Talc+15% sabadilla seed | 26 | 4 |
| Talc+2.5% derris root+7.5% sabadilla seed | 30 | 0 |
| Control test | 0 | 30 |

A ground mixture of 2.5 parts radix derridis ellipticæ, 7.5 parts semen sabadillæ and 90 parts talcum proved useful in exterminating grasshoppers (for instance tachycines asynamorus), flea beetles, bugs (lygus campestris) and many kinds of caterpillars. Instead of the drugs themselves we may also use their effective extracts or the alkaloids recovered therefrom, for instance by mixing .2% rotenon, .3% veratrin and 99.5% kaolin.

In view of the lower price of semen sabadillæ we have found it recommendable to use mixtures containing more semen sabadillæ than derris root.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. An insecticidal preparation consisting of a mixture containing rotenon and veratrin.

2. An insecticidal preparation consisting of a mixture containing drugs containing rotenon and veratrin.

3. An insecticidal preparation consisting of a mixture containing extracts of drugs containing rotenon and veratrin.

4. An insecticidal preparation consisting of a mixture containing rotenon, veratrin and a filler.

5. An insecticidal preparation consisting of a mixture containing radix derridis ellipticæ and semen sabadillæ.

6. An insecticidal preparation consisting of a mixture containing 2.5 parts radix derridis ellipticæ and 7.5 parts semen sabadillæ.

HERBERT SCHOTTE.
KARL GÖRNITZ.